United States Patent [19]

Mueller

[11] Patent Number: 4,642,923
[45] Date of Patent: Feb. 17, 1987

[54] MOUNTING BOARD FOR NEEDLEWORK DESIGNS

[76] Inventor: Helga Mueller, 2216-51st Ave., Greeley, Colo. 80632

[21] Appl. No.: 743,285

[22] Filed: Jun. 11, 1985

Related U.S. Application Data

[63] Continuation of Ser. No. 577,203, Feb. 6, 1984, abandoned.

[51] Int. Cl.$^4$ ............................................. D03C 6/08
[52] U.S. Cl. ................................... 38/102; 38/102.1; 38/102.91; 428/906.6
[58] Field of Search ................. 38/102, 102.1, 102.91; 428/906.6, 131, 132

[56] References Cited

U.S. PATENT DOCUMENTS

| | | | |
|---|---|---|---|
| Re. 21,962 | 12/1941 | Gard | 38/102.1 |
| 247,478 | 9/1881 | Brigham | 428/131 X |
| 460,663 | 10/1891 | Searvogle | 40/158 R |
| 1,546,400 | 7/1925 | Nichols | 38/102 X |
| 1,850,115 | 3/1932 | McCarthy | 434/95 |
| 2,118,880 | 5/1938 | Davis | 38/102.1 |
| 2,283,026 | 5/1942 | Yates | 40/158 R |
| 2,585,946 | 2/1952 | Liberman | 434/95 |
| 3,678,607 | 7/1972 | Tabor et al. | 38/102.91 |
| 3,830,278 | 8/1974 | Packer | 38/102.91 X |
| 3,924,343 | 12/1975 | Johnson | 38/102.1 |
| 4,097,968 | 7/1978 | Pikus | 38/102.91 X |
| 4,279,087 | 7/1981 | Crawford | 40/158 R |
| 4,378,646 | 4/1983 | Mazeika | 38/102 |

FOREIGN PATENT DOCUMENTS

| | | | |
|---|---|---|---|
| 48607 | 4/1934 | Denmark | 38/102.1 |
| 349488 | 12/1904 | France | 38/102.1 |
| 2050445 | 1/1981 | United Kingdom | 434/95 |

OTHER PUBLICATIONS

"Continental Stitch", Barbara Hunter, Leisure Arts, 1973.

*Primary Examiner*—Nancy A. B. Swisher
*Attorney, Agent, or Firm*—William E. Hein

[57] ABSTRACT

A planar mounting board for needlework designs includes a multiplicity of evenly spaced perforations or holes along the periphery thereof to facilitate the precise mounting thereto of a canvas or fabric containing a completed needlework design by stitching the canvas or fabric to the mounting board through the perforations therein.

1 Claim, 1 Drawing Figure

MOUNTING BOARD FOR NEEDLEWORK DESIGNS

CROSS REFERENCE TO RELATED APPLICATION

This application is a continuation of application Ser. No. 577,203, filed Feb. 6, 1984, now abandoned.

BACKGROUND AND SUMMARY OF THE INVENTION

This invention relates generally to needlework and more specifically to a framing or mounting board for displaying completed needlework designs. Various types of needlework such as needlepoint and cross stitch embroidery are practiced regularly by thousands of needlework enthusiasts. Most needlework involves the formation of stitches, using yarn of various colors, to form an ornamental design, on a canvas or other fabric that is typically constructed of lengthwise and crosswise threads. Upon completion of the needlework design, it is generally desired to display the finished work on a mounting board, typically a stiff cardboard material over which the needlework fabric is stretched and to which it is then affixed either by glueing or by hand lacing the fabric on the rear of the board out of sight of the viewer. These known methods of attaching a finished needlework design to a mounting board are disadvantageous in that they are inaccurate, time consuming, and messy. In addition, the mounting board must first be cut to size, since it is typically supplied in bulk oversize sheets. Generally, this is accomplished by the hobbyist using ordinary houshold tools that do not facilitate very precise cuts. As a result, it is difficult to squarely mount a finished design on a board that may itself not be square. An out-of-square mounting detracts from the appearance of the finished design due to the fact that the canvas or fabric on which the needlework is performed is comprised of orthogonally positioned threads.

It is, therefore, the principal object of the present invention to provide a flat board on which the hobbyist may squarely mount a finished needlework design using simple and inexpensive home tools. This object is accomplished in accordance with the illustrated preferred embodiment of the invention by providing a rectangular mounting board that is precisely precut to size and that includes a multiplicity of evenly spaced perforations along the periphery thereof. Using such a mounting board, the hobbyist need simply align the woven threads of the canvas or fabric with each edge of the mounting board, and then lace the canvas or fabric to the mounting board by means of a double whip stitch through the perforations.

DESCRIPTION OF THE PREFERRED EMBODIMENT

Figure 1:
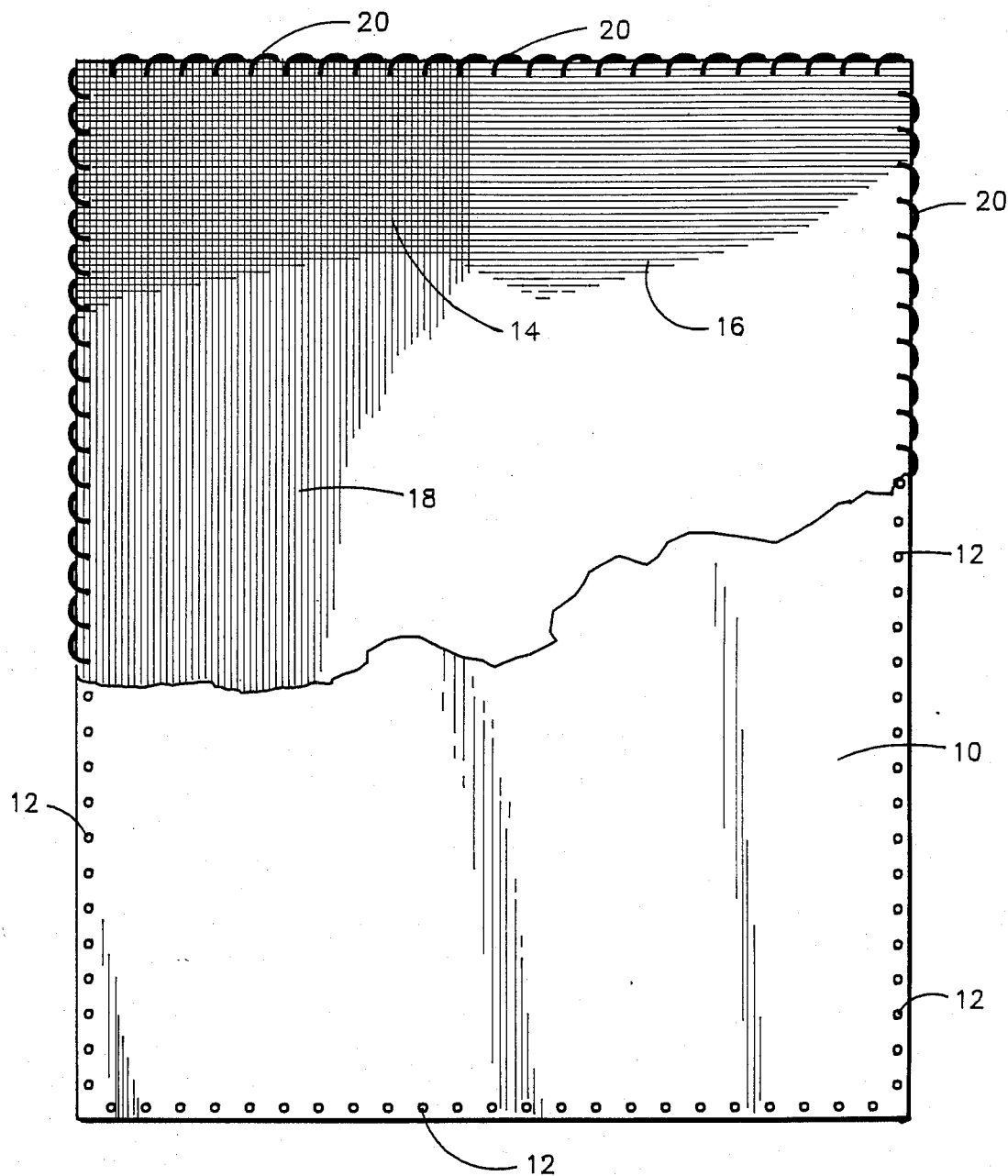
FIG. 1 is a plan view of a mounting board for needlework designs illustrating the perforations or holes located along the periphery thereof in accordance with the present invention.

Referring now to FIG. 1, there is illustrated rectangular, planar mounting board 10 that may comprise any of a number of commercially available stiff cardboard materials fabricated for the needlepoint industry. Mounting board 10, percut to a desired size, includes a multiplicity of generally evenly spaces holes 12 located along the entire periphery thereof. It has been found workable to space holes 12 approximately ¼ inch apart and 1/16 inch from each edge of mounting board 10. A needlepoint fabric or canvas 14 containing the hobbyist's stitched design is then positioned over mounting board 10 such that the horizontal and vertical woven threads 16 and 18, respectively, of fabric or canvas 14 are aligned with the corresponding edges of the mounting board 10. Preferably, approximately ½ inch of fabric or canvas 14 is folded over the edges of mounting board 10 such that the opposite ends of fabric or canvas 14 may then be conventionally laced on the back side of mounting board 10, out of sight of the viewer, to insure that fabric or canvas 14 is taut on the front side of mounting board 10. Once aligned to the hobbyist's satisfaction, the fabric or canvas 14 is then secured to mounting board 10 using a standard whip stitch through each of the spaced holes 12.

I claim:

1. A method for permanently mounting a canvas or other fabric material composed of orthogonally woven fibers and having an artwork design stitched thereon onto a flat, rigid, generally rectangular mounting board having a multiplicity of generally evenly spaced prepunched perforations along the periphery thereof, the method comprising the steps of:

laying the canvas or other fabric material in a flat position in total and direct contact with a front surface of the flat mounting board such that the artwork design is in a desired position with respect to the periphery of the flat mounting board;

trimming the canvas or other fabric material such that the dimensions thereof exceed the corresponding dimensions of the flat mounting board so as to provide a border of excess canvas or other fabric material overlaying the periphery of the flat mounting board;

aligning the orthogonally woven fibers of the canvas or other fabric material with the corresponding edges of the flat mounting board;

folding the border of the canvas or other fabric material over the respective edges of the flat mounting board to the back surface thereof;

lacing opposite edges of the folded over border on the back surface of the flat mounting board; and securing the canvas or other fabric material to the flat mounting board by applying whip stitches through the canvas or other fabric material and the prepunched perforations located along the periphery thereof.

* * * * *